Nov. 14, 1961  S. BECKWITH  3,008,483
COLD BOILING LIQUID STORAGE TANK RELIEF VALVE
Filed July 7, 1958  2 Sheets-Sheet 1

INVENTOR.
Sterling Beckwith
BY
Ooms, McDougall, Williams & Hersh
Attorneys

INVENTOR.
Sterling Beckwith
BY
Ooms, McDougall, Williams & Hersh
Attorneys 3,008,483
COLD BOILING LIQUID STORAGE TANK
RELIEF VALVE
Sterling Beckwith, Lake Forest, Ill., assignor, by mesne assignments, to Conch International Methane Limited, Nassau, Bahamas, a corporation of the Bahamas
Filed July 7, 1958, Ser. No. 746,747
4 Claims. (Cl. 137—375)

This invention relates generally to improvements in tanks for storing cold boiling liquids, and more particularly, but not by way of limitation, to a valve construction for relieving excessive pressure in tanks used for storing liquefied natural gas.

As it is well known, certain areas have an excess supply of natural gas while other areas have little or no natural gas. Where such areas are located a reasonable distance apart and are joined by land, transportation of natural gas from an area having an abundance of natural gas to an area having a natural gas shortage may be economically accomplished by use of a pipeline with the natural gas in gaseous form. However, when such areas are separated by substantial distances and/or by large bodies of water, transportation of the natural gas by pipeline becomes impractical and the use of tanks for shipping the gas becomes more feasible. Tanks may be used to ship the natural gas in gaseous form, but the large volume occupied by the gas in this form makes shipping in this manner uneconomical. As a result, a new industry is in the stage of development for the primary purpose of liquefying natural gas in areas having an oversupply, shipping the natural gas in liquid form, and then revaporizing the gas in areas having a natural gas shortage. The liquefied natural gas has about $\frac{1}{600}$ the volume of natural gas in gaseous form at equivalent pressure, thereby making transportation by tanks more practical. However, it is most desirable to ship the liquefied natural gas at about atmospheric pressure, or slightly above, to minimize the required strength of the tanks used in shipping the gas, as well as the safety of the operation. Liquefied natural gas at about atmospheric pressure has a temperature of from −240 to −258° F., which presents several novel problems.

The insulation of the tanks cannot, of course, be perfect. Therefore, at least a minor amount of heat will reach the cold liquefied natural gas and provide a constant evaporation of the gas. Also, inherent erratic transfer of heat to the liquefied natural gas causes a rate of evaporation which cannot always be predicted. In order to minimize the required strength of the transporting tanks, any excessive pressure must be quickly and automatically relieved. Conventional relief valves constructed out of steel cannot be used with the cold temperatures involved. It may also be noted that the excessive pressures cannot be relieved by merely providing a removable plug in the top of a tank of this type since the insulation of the tank must be preserved and the tank closed off quickly after the excessive pressure is released to assure that no air enters the tank to develop an explosive mixture.

The present invention contemplates a novel tank construction for the storage and transportation of cold boiling liquids having a pressure-relieving device interposed in the top wall thereof wherein an extremely small increase in pressure in the tank will be quickly relieved and the tank quickly closed without substantially reducing the normal insulation of the tank. More specifically, the present invention contemplates a construction for the top wall of tank wherein a large opening is formed in the top wall and the insulating material carried by the top wall, with a plug of insulating material sealed in the opening by the use of novel rings arranged in vertically spaced relation which provide a series of vertically spaced seals around the opening and prevent any appreciable transfer of heat through the opening when the plug is seated in the opening. This invention also contemplates the support of the plug by the top wall of the tank, as contrasted with being supporting by the insulating material carried by the top wall of the tank, such that the sealing rings will cause no appreciable wear of the portions of the tank-insulating material contacted by the rings, yet the rings will be sufficiently engaged with the tank-insulating material to effect the desired seals. In the preferred embodiment, the plug is weighted to retain the plug in position until the desired relieving pressure is reached, and the plug is guided in and out of the opening to assure a seal of the plug in the tank. This invention further contemplates a secondary seal between the plug and the top wall of the tank to assure that insulation of the tank will be preserved when the plug is inserted in the tank.

An important object of this invention is to increase the safety of storing and shipping cold boiling liquids, such as liquefied natural gas.

Another object of this invention is to precisely control the internal pressure of tanks housing cold boiling liquids.

Another object of this invention is to relieve excessive pressure in a tank containing a liquefied natural gas without admitting any appreciable amount of air into the tank when the excessive pressure has been relieved.

A further object of this invention is to provide an effective seal of a removable plug in an insulated tank whereby the plug may be frequently removed and replaced without reducing the normal insulation of the tank.

A still further object of this invention is to provide a pressure-relieving structure in an insulated tank which is simple in construction, will have a long service life, and may be economically manufactured.

Other objects and advantages of the invention will be evident from the following detailed description, when read in conjunction with the accompanying drawings which illustrate my invention.

Figure 1:
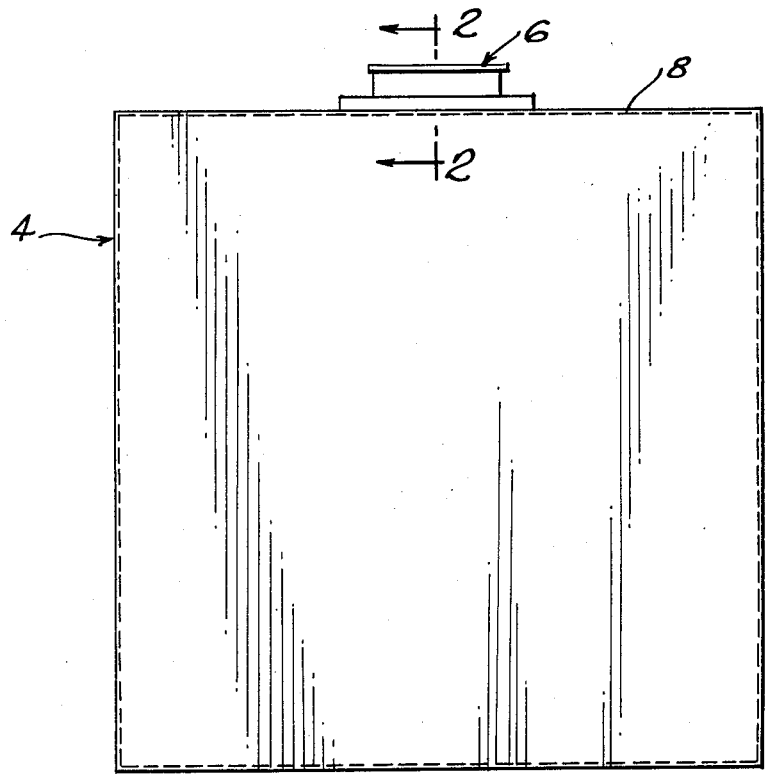
FIGURE 1 is an elevational view of an insulated tank illustrating the preferred location of the pressure-relieving plug.

Referring to the drawings in detail and particularly FIG. 1, reference character 4 generally designates a tank for storing cold boiling liquids and having a relief plug, generally designated by reference character 6, in the central portion of the top wall 8 thereof. The shell of the tank 4 is normally metal, with the side walls and bottom of the tank suitably insulated in any desired manner (not shown), and the top wall 8 having an insulating material 10 (FIG. 2) secured along the bottom face thereof. The insulating material 10 is preferably balsa wood, although it will be understood that any other suitable insulating material may be used.

Figure 2:
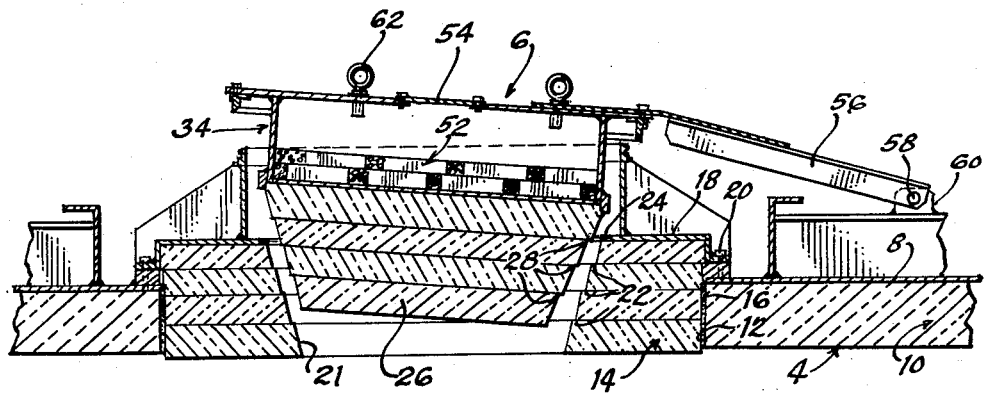
FIGURE 2 is an enlarged sectional view as taken along lines 2—2 of FIG. 1, with the plug being in a slightly raised position.

As shown in FIG. 2, a large circular aperture 12 is formed through the center of the top tank wall 8 and the insulating material 10 to receive a ring-shaped insert 14 of insulating material, which is also preferably balsa wood. For convenience in manufacture, the ring 14 is formed by several layers of balsa wood sealed together and is suitably sealed around its outer periphery to the walls of the aperture 12 by small strips of balsa wood and a suitable sealing agent 16, such that the ring 14 effectively forms a part of the insulation for the top of the tank. The ring 14 is rigidly secured to the top wall 8 by a metal ring 18 suitably cemented to the top face of the ring 14 and attached to the wall 8 by bolts 20. It will thus be apparent that the ring 14 may be considered a continuation of the insulating material 10, and the ring 18 a continuation of the top wall 8 of the tank 4.

The aligned bores through the rings 14 and 18 form a large opening 21 in the top of the tank 4 to receive the plug 6. The opening 21 is of substantial size relative to the diameter of the tank 4, such that excessive gas in the tank 4 may be quickly released through the opening 21 when the plug 6 is removed, as will be described. The sides of the opening 21 extending through the insulating material ring 14 are tapered generally downwardly and inwardly, with a plurality of concentric and upwardly facing circumferential shoulders 22 formed in vertically spaced relation through the thickness of the ring 14, as by progressively decreasing the inner diameters of the layers of balsa wood comprising the ring 14. The inner periphery of each layer of balsa wood in the ring 14 is also tapered downwardly and inwardly to form the general tapered configuration for the opening 21. Furthermore, a shallow counter-bore 24 is formed in the upper face of the ring 18 around the opening 21 for purposes which will be described.

Figure 3:
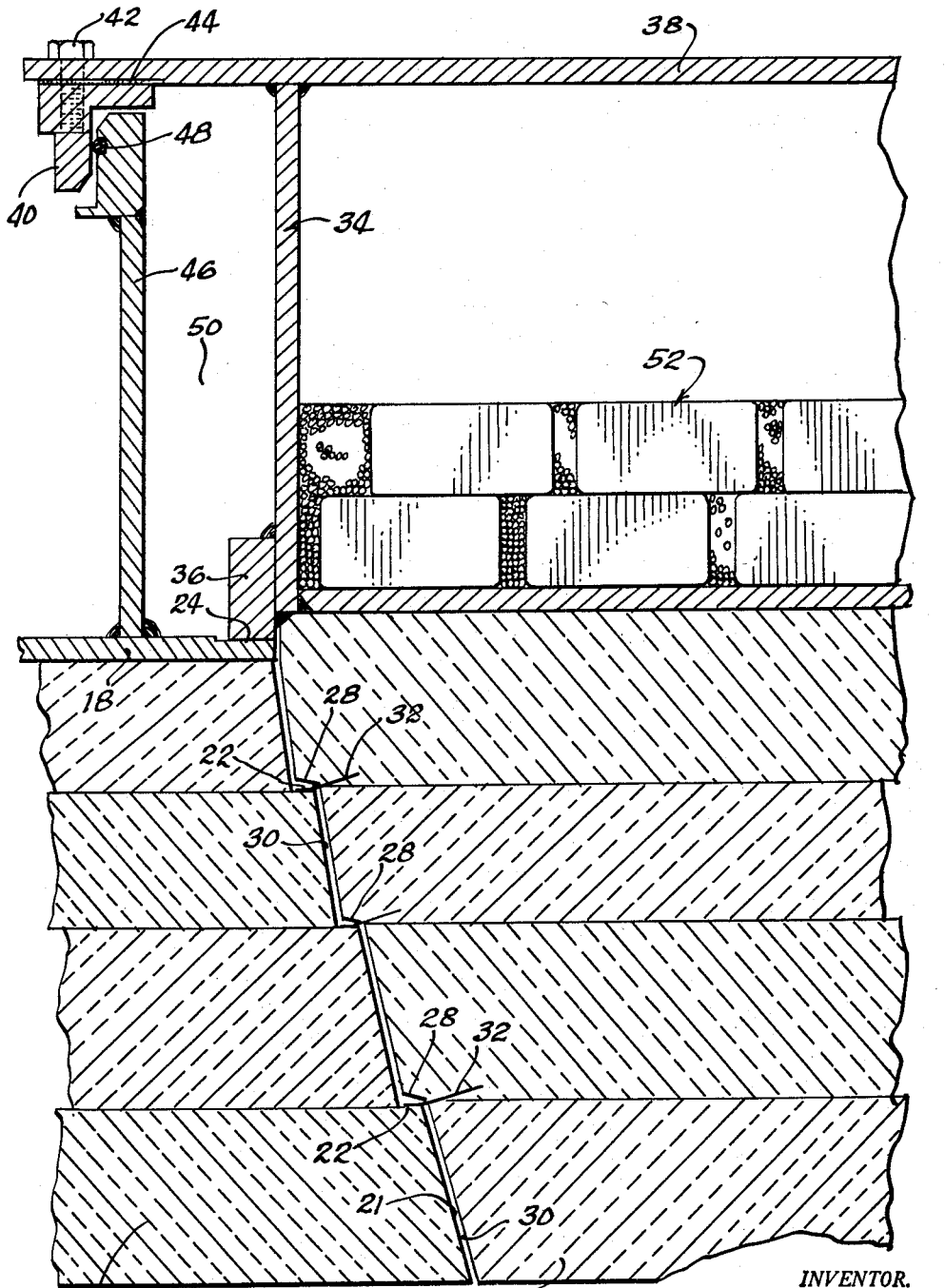
FIGURE 3 is a still further enlarged sectional view through one side of the plug structure to illustrate details of construction.

The lower portion 26 of the plug 6 is formed out of insulating material and is preferably formed out of the same number of layers of balsa wood as the ring 14 to provide the insulating material portion 26 of the plug with the same thickness as the ring 14. The outer periphery of the plug portion 26 is shaped in substantially the same manner as the inner periphery of the ring 14, except that the downwardly facing circumferential shoulders 28 formed around the portion 26 to mate with the shoulders 22 in the ring 14 are tapered upwardly and outwardly, as shown in FIG. 3, to increase the clearance between the shoulders 22 and 28 when the plug 6 is inserted in the opening 21. It will also be observed in FIG. 3 that the outer diameter of each portion of the plug portion 26 is slightly less than the inner diameter of the mating portions of the ring 14 to provide a clearance 30 around the plug 6 when the plug is inserted in the opening 21.

A sealing ring 32 is embedded in the outer periphery of the plug portion 26 at the lower end of each of the circumferential shoulders 28 and extends downwardly and outwardly from the plug portion 26 to engage the mating shoulder 22 in the insulating ring 14. Each sealing ring 32 is sealed in the plug portion 26 and is so positioned relative to the seated position of the plug 6, as will be hereinafter described, to make sealing contact with the respective shoulder 22. I prefer to form the rings 32 out of brass with sufficient thinness, such as 0.008 inch, that the rings will not support the weight of the plug 6, and will at least slightly bend when the plug 6 is seated. When the brass rings 32 are forced against the balsa wood shoulders 22 with sufficient force to bend the rings, each ring 32 and shoulder 22 will provide a substantially gas-tight seal and retain a pocket of gas in the clearance 30 between the rings. These pockets of gas provide a practical continuation of the insulation provided by the ring 14 and the plug portion 26 to minimize the transfer of heat into the tank 4. It should also be noted that since the rings 32 bend upon contact with the shoulders 22, the rings will not cause an appreciable wear of the shoulders 22.

A housing 34 is cemented or otherwise sealingly secured to the top face of the plug portion 26 and is provided with a support ring 36 around the lower end thereof of a size to seat in the counter-bore 24 in the metal ring 18 to support the plug 6 in the opening 21. As previously indicated, the support ring 36 is so positioned on the plug 6 that the sealing rings 32 will be in contact with the respective shoulders 22 and will be slightly bent when the support ring 36 is seated in the counter-bore 24.

The top plate 38 of the housing 34 extends outwardly around the housing to support a seating ring 40 around the upper end of the housing. The seating ring 40 is secured to the top plate 38 by suitable bolts 42, and is sealed to the lower face of the top plate 38 by a suitable cement 44. Also, the seating ring 40 extends downwardly over a guard ring 46 welded or otherwise secured and sealed to the ring 18 around the opening 21. An O-ring 48 is carried by the ring 46 in a position to engage the inner periphery of the seating ring 40 when the plug 6 is seated in the opening 21 to provide a secondary seal against the leakage of gas through the opening 21. It will then be apparent that a gas-tight chamber 50 is formed around the housing 34 to receive and store any gas which may escape around the sealing rings 32 previously described. The chamber 50 also acts in the nature of a cushioning chamber to control the final closing movement of the plug 6, and further guard against air entering the tank 4. It will be noted that just prior to the seating of the plug 6, the seating ring 40 will contact the O-ring 48 to limit a further exhaust of gas from the chamber 50 and retard further downward movement of the plug 6, thereby cushioning the seating of the support ring 36 and the sealing rings 32. Furthermore, the gas in the chamber 50 will be a portion of the gas exhausted from the tank 4 to provide a barrier against air entering the tank when the excessive pressure has been released.

The pressure in the tank 4 at which the plug 6 will move upwardly is governed by the weight of the plug 6 and the area of the lower end portion of the plug portion 26. As previously noted, the plug 6 is preferably made large, such that the plug may be raised by a very slight increase in pressure in the tank 4. The weight of the plug 6 is controlled by ballast 52 in the housing 34. This ballast may be in the form of cast iron blocks and lead shot, as shown, or any other desired weighting material. As shown in FIG. 2, a plate 54 may be secured over an opening in the top plate 38 to facilitate the adding or removal of ballast 52 when it is desired to change the relieving pressure required to raise the plug 6.

The path of movement of the plug 6 is controlled by a suitable arm 56 rigidly secured to one side of the housing top plate 38 and extending radially outward from the plug 6 over the top wall 8 of the tank. The outer end of the arm 56 is pivotally secured by a shaft 58 to suitable brackets 60 mounted on the top wall 8 of the tank, such that the plug 6 will pivot about the center line of the shaft 58. It will also be noted that the arm 56 should have a substantial width and secured to the shaft 58 at laterally spaced points to more precisely guide the plug 6 as the plug is moving in or out of the opening 21.

The operation of the plug 6 will no doubt be apparent from the foregoing description in that an excessive gas pressure in the tank 4 of a predetermined magnitude will act on the lower end of the plug 6 and raise the plug in the opening 21 until the excess pressure is released, whereupon the plug will fall by gravity until the support ring 36 is seated in the counter-bore 24. With the plug 6 seated in the opening 21, the sealing rings 32 and cooperating shoulders 22 provide a plurality of vertically spaced seals around the opening 21. Also, the seating ring 40 and O-ring 48 provide a secondary seal of the plug to the top wall of the tank. Since the plug 6 will be of appreciable weight, it will move downwardly quickly when the excessive pressure is released from the tank to assure that no air will enter the tank and provide an explosive mixture. Also, the chamber 50 retains a supply of the type of gas exhausted from the tank around the opening 21 when the excess gas has been released to further assure that no air will enter the tank. The arm 56 will not only guide the plug 6 into the desired seating position, but will also prevent loss of the plug in the event the plug is blown upwardly with substantial force.

Suitable lifting eyes 62 are preferably secured in the top plate 38 of the housing 34 to facilitate installation and removal of the plug 6.

From the foregoing it will be apparent that the present invention will increase the safety of storing and shipping cold boiling liquids, such as liquefied natural gas. The slightest increase in pressure in the tank containing the cold boiling liquids will be quickly removed to minimize the required strength of the tank and assure that the cold boiling liquid will not leak from the tank and cause damage to the transporting facilities. Also, excessive gas is removed from a tank containing a cold boiling liquid without air entering the tank and providing an explosive mixture in the tank. With the present plug construction, the normal insulation of a tank is preserved, even though the plug is frequently moved in and out by excessive pressure conditions. It will be further apparent that the present tank construction is simple, will have a long service life, and may be economically manufactured.

Changes may be made in the combination and arrangement of parts or elements as heretofore set forth in the specification and shown in the drawings, it being understood that changes may be made in the precise embodiment disclosed without departing from the spirit and scope of the invention as defined in the following claims.

I claim:

1. In a tank for storing cold boiling liquids, a top wall, insulating material secured along the lower face of the top wall, said top wall and insulating material having an opening therethrough with at least two upwardly facing and vertically spaced circumferential shoulders in the insulating material forming the walls of the opening, the lower shoulder being smaller in diameter than the upper shoulder, a plug of insulating material shaped to fit loosely in said opening, and rings carried by said plug arranged to seat on said shoulders and provide a gas-impervious seal at each ring and mating shoulder, an arm rigidly secured to said plug and pivotally secured to the top wall of the tank to guide the plug in and out of said opening upon substantial variations in pressure in the tank and a guard ring secured on the top of the tank top wall around said opening, a top plate sealingly secured on top of the plug and having a diameter greater than the diameter of the portion of the plug entering said opening, and a seat secured around the outer periphery of said top plate of a size to engage said guard ring and provide a secondary seal of the plug in the opening.

2. In a tank for storing cold boiling liquids, a top wall for the tank, insulating material secured along the lower face of the top wall, said top wall and insulating material having an aperature in the central portion thereof, a ring-shaped insert of insulating material sealed in said aperature, the inner diameter of said insert being stepped downwardly and inwardly to form vertically spaced and upwardly facing circumferential shoulders in said insert, a plug of insulating material having its outer periphery stepped and being of a size to fit loosely in said insert, sealing rings embedded in the outer periphery of the plug and extending outwardly around the plug in positions to engage the upwardly facing shoulders in said insert when the plug is inserted in said insert, a housing sealed on top of said plug, a guard ring extending upwardly from said insert around said housing, a realing ring carried in the upper end of the guard ring, a seating ring carried around the housing in a position to engage the sealing ring carried by the guard ring and form a closed chamber around the housing when the plug is seated in said insert and wherein the seating ring carried by said housing is arranged to encompass and engage the sealing ring carried by the guard ring before the sealing rings embedded in the plug engage said shoulders in said insert, and means for guiding the plug in and out of said insert.

3. A construction as defined in claim 2 characterized further to include a metal ring sealed on top of said insert, a support ring secured around said housing in a position to engage the metal ring on said insert and support the plug in said insert.

4. A construction as defined in claim 2 wherein the sealing rings embedded in the plug are brass and have a thinness such that said rings bend when the weight of the plug is imposed thereon.

References Cited in the file of this patent

UNITED STATES PATENTS

| 455,913 | Walker | July 14, 1891 |
| 1,750,631 | Eaglesfield | Mar. 18, 1930 |
| 1,756,746 | Hogan | Apr. 29, 1930 |
| 1,847,385 | Dengler | Mar. 1, 1932 |
| 1,869,812 | Holbrook | Aug. 2, 1932 |
| 1,892,708 | Schwarz | Jan. 3, 1933 |
| 2,239,511 | West | Apr. 22, 1941 |

FOREIGN PATENTS

| 906,074 | France | May 7, 1945 |